H. M. NORRIS.
RADIAL DRILL.
APPLICATION FILED NOV. 25, 1910.
1,058,254.
Patented Apr. 8, 1913.
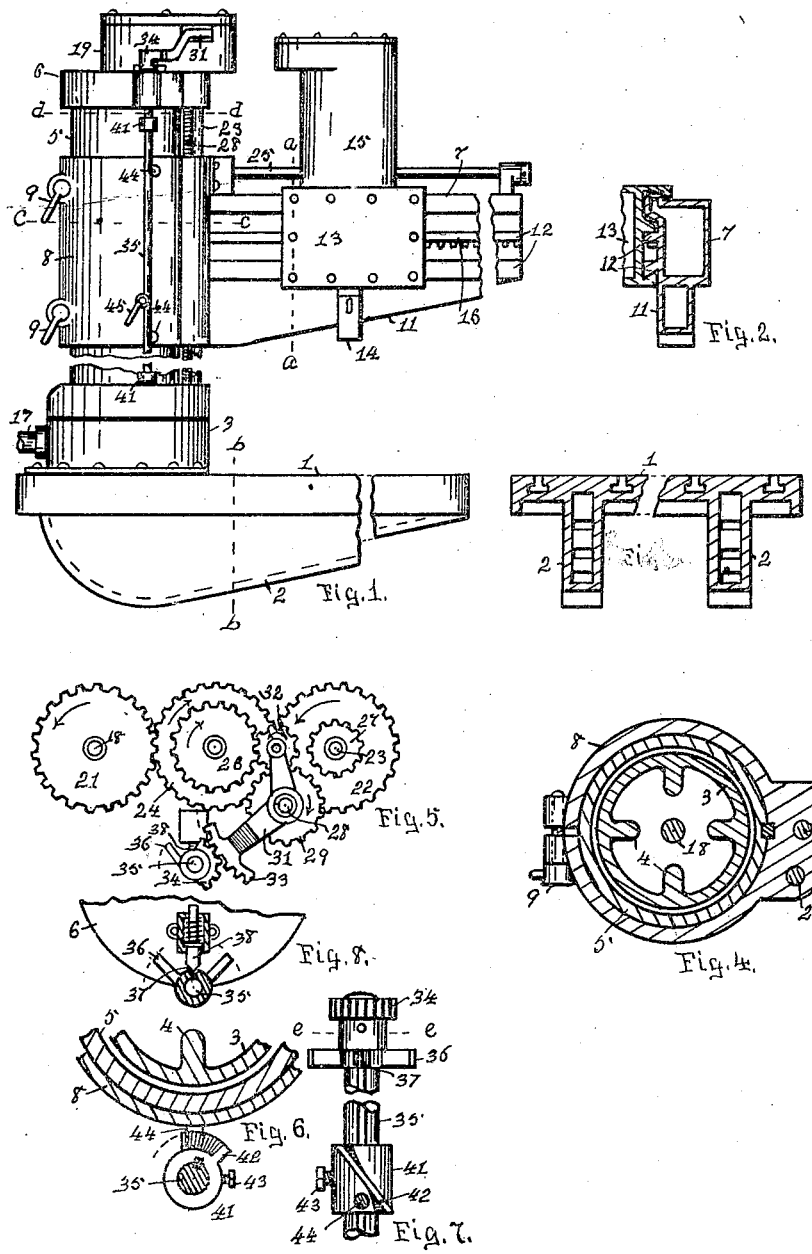
Witnesses.
James G. Carr
R. A. Kumler
Henry M. Norris, Inventor,
By Robert S. Carr, Atty.

UNITED STATES PATENT OFFICE.

HENRY M. NORRIS, OF CINCINNATI, OHIO, ASSIGNOR TO THE CINCINNATI BICKFORD TOOL CO., OF CINCINNATI, OHIO, A CORPORATION OF OHIO.

RADIAL DRILL.

1,058,254.     Specification of Letters Patent.     Patented Apr. 8, 1913.

Application filed November 25, 1910. Serial No. 594,082.

*To all whom it may concern:*

Be it known that I, HENRY M. NORRIS, a citizen of the United States, residing at Cincinnati, Ohio, have invented a new and useful Improvement in Radial Drills, of which the following is a specification.

My invention relates to radial drills and the objects of my improvements are to provide an adjustable automatic trip for limiting the vertical movement of the radial arm; to provide the radial arm with a narrow guideway for preventing any angular movement of the sliding head in relation thereto; to form the radial arm with box ribbing and the column with internal ribbing for securing greater strength and rigidity with substantially the same weight of material; to form the base with depending ribs properly disposed to resist the working strains thereon and to provide such simple and durable construction and assemblage of the various members as to secure the greatest facility of operation together with increased efficiency and accuracy of action. These objects are attained in the following described manner as illustrated in the accompanying drawings, in which:—

Figure 1 is a front elevation of a radial drill embodying my improvements; Figs. 2 and 3 vertical sections respectively on the lines *a*—*a* and *b*—*b* of Fig. 1; Fig. 4 a horizontal section on the line *c*—*c* of Fig. 1; Fig. 5 a plan showing the gear connections with the automatic trip; Fig. 6 a broken horizontal section on the line *d*—*d* of Fig. 1; Fig. 7 a rear elevation of the vertically adjustable helical trip and of the segmental pinion, and Fig. 8 a horizontal section on the line *e*—*e* of Fig. 7.

In the drawings, 1 represents the base formed with hollow depending longitudinal ribs 2 for reinforcing its strength and especially on the line *b*—*b* of Fig. 1 and maintaining its rigidity under the action of the boring tool. A vertical column 3 rigidly secured on the base is formed with internal ribs 4 for reinforcing its strength and maintaining its rigidity in relation to the base. A rotatively adjustable sleeve 5 encircles the column and is provided with a cap 6. The radial arm 7 is formed at one end with a split collar 8 which is splined on the sleeve and maintained in vertical adjustment thereon by means of clamping screws 9. Said arm is formed hollow of rectangular shape and with a tapering box rib 11 thereunder for better resisting the upward thrust of the boring tool during action and for preventing it from springing out of parallel with the plane of the base. The rib 11 permits arm 7 to be formed with a narrow guideway 12 on its face without detracting from its strength. The elongated head bearing 13 for the spindle 14 is provided with the spindle gear box 15 and adjustably mounted on the guideway 12 in such manner that its longitudinal surface of contact therewith considerably exceeds the width of the guideway for better preventing its angular movement in relation to the arm 7.

A hand wheel and pinion (not shown) serves to engage with the rack 16 for adjusting the head 13 along the arm, and the driving shaft 17 serves to actuate the central vertical shaft 18 by means of bevel gears (not shown) and in the usual manner. The gear box 19 mounted on the cap 6 serves to inclose the series of gears shown in Fig. 5. Gear 21 secured on the vertical center shaft 18 drives gear 22 secured on shaft 23 by means of the intermediate idle gear 24. Said shaft 23 engages with the radial shaft 25 by means of bevel gears (not shown) for actuating the spindle driving and reversing gears (not shown) in the box 15 in the ordinary manner. A gear 26 and a smaller gear 27 are secured to turn with the respective gears 24 and 22. A vertical screw shaft 28 is adjustably threaded in the radial arm and journaled at its respective ends in the base of the sleeve and the sleeve cap is provided with a gear 29. A bell crank lever 34 pivotally mounted on the screw 28 carries at one end a pinion 32 in continuous engagement with gear 29. The other end of said lever terminates in a segmental rack 33 in engagement with a segmental pinion 34, said pinion is secured on the vertical shifting rod 35 and formed with projecting arms 36 adapted to contact with the spring actuated plunger 38 for limiting the mesh of the pinion 32 with the gears 26 and 27 and also with an intervening notch 37 adapted to engage with the taper point of said plunger 38 for moving and yieldingly maintaining said pinion in an intermediate position of rotation.

Trip collars 41 each formed with a helical flange 42 and provided with a set screw 43 are splined on opposite end portions of the shifting rod 35, for engaging with the respective lugs 44 which project in line therewith from the collar 8 of the radial arm. A hinged hand lever 45 serves to turn the shifting rod for alternately engaging the pinion 32 with the gears 26 and 27 whereby the gear 29 with the screw shaft may be actuated in respective opposite directions and at different speeds, for adjusting the radial arm vertically on the sleeve. The contact of the arms 36 with the casing of the plunger 38 serves to maintain the bell crank lever with the pinion 32 in proper mesh with the corresponding gears 26 and 27.

By means of the set screws 43 the trip collars 41 may be secured at any desired intervening points in the length of the shifting rod 35 for intercepting with their helical flanges the corresponding lugs 44 in the vertical movement of the radial arm. The sliding contact of said lugs with said flanges serves to partially turn the shifting rod and move the bell crank lever with the pinion 32 out of engagement with the corresponding gear 26 or 27 for automatically discontinuing the action of the screw. A further movement of pinion 32 is effected by the entrance of the plunger 38 within the notch 37 for preventing accidental engagement of the said pinion with either of said gears 26 or 27. In this manner the vertical movement of the arm may be automatically stopped at any desired predetermined point of elevation and safety limits are provided for its extreme movement.

Having fully described my improvements what I claim as my invention and desire to secure by Letters Patent of the United States is:—

1. The combination of a column, a radial arm supported thereon, a screw for vertically adjusting the arm, driven gear connections for actuating the screw, shifting mechanism therefor actuated by said vertical adjustment of the arm, stops for limiting the engaging movement of said connections, and automatic means for completing the disengaging movement of said connections and maintaining them under a yielding pressure out of action.

2. The combination of a column, a radial arm supported thereon, driven screw and gear mechanism for adjusting the arm vertically, a rotatively adjustable shifting rod therefor, adjustable means automatically actuated by said vertical adjustment of the arm for rotating the rod, stops for limiting the said adjustment of the rod in one direction, and automatic means for adjusting and maintaining the rod under a yielding pressure in the opposite direction for the purpose specified.

H. M. NORRIS.

Witnesses:
R. S. CARR,
H. O. FRECH.